United States Patent
Zitzmann et al.

(10) Patent No.: US 9,867,206 B2
(45) Date of Patent: Jan. 9, 2018

(54) SIGNALING EXTENDED EARFCN AND E-UTRA BANDS IN UMTS NETWORKS

(71) Applicant: Intel IP Corporation, Santa Clara, CA (US)

(72) Inventors: Michael Zitzmann, Nuremberg (DE); Hyung-Nam Choi, Hamburg (DE); Geethika Kankipati, Bangalore (IN); Sudeep Manithara Vamanan, Nuremberg (DE); Birgit Breining, Munich (DE); Bismark Okyere, Neubiberg (DE)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 15/026,788

(22) PCT Filed: Oct. 31, 2014

(86) PCT No.: PCT/US2014/063434
§ 371 (c)(1),
(2) Date: Apr. 1, 2016

(87) PCT Pub. No.: WO2015/066476
PCT Pub. Date: May 7, 2015

(65) Prior Publication Data
US 2016/0255640 A1  Sep. 1, 2016

Related U.S. Application Data

(60) Provisional application No. 61/898,425, filed on Oct. 31, 2013.

(51) Int. Cl.
*H04W 72/10* (2009.01)
*H04W 24/10* (2009.01)
(Continued)

(52) U.S. Cl.
CPC .......... *H04W 72/10* (2013.01); *H04B 17/318* (2015.01); *H04J 3/1694* (2013.01);
(Continued)

(58) Field of Classification Search
CPC . H04W 36/0094; H04W 8/245; H04W 24/00; H04W 84/04; H04W 48/18;
(Continued)

(56) References Cited

U.S. PATENT DOCUMENTS 9,118,452 B2  8/2015  Park et al.
9,144,091 B2  9/2015  Yamada et al.
(Continued)

FOREIGN PATENT DOCUMENTS

CN  100411470 C  8/2008
CN  105379148 A  3/2016
(Continued)

OTHER PUBLICATIONS

"U.S. Appl. No. 13/659,655, Response filed Jul. 14, 2016 to Final Office Action dated May 20, 2016", 17 pgs.
(Continued)

*Primary Examiner* — Nizar Sivji
(74) *Attorney, Agent, or Firm* — Schwegman Lundberg & Woessner, P.A.

(57) ABSTRACT

Embodiments of a user equipment (UE) and Node-B to operate in a wireless communication network using extended evolved absolute radio frequency channel numbers (EARFCN) and evolved Universal Terrestrial Radio Access (E-UTRA) frequency bands are disclosed herein. The UE may comprise transceiver and processing circuitry to receive a multiple frequency band indicators (MFBI) list that includes list elements corresponding to E-UTRA frequency bands on which neighboring LTE cells are operated. The MFBI list corresponds to an entry in the E-UTRA frequency
(Continued)

and priority list or the E-UTRA frequency and priority extension list. The number of list elements for E-UTRA frequency and priority information corresponds to a sum of the number of entries in an E-UTRA frequency and priority list and a number of entries in an E-UTRA frequency and priority extension list. Other embodiments are disclosed.

12 Claims, 7 Drawing Sheets

(51) Int. Cl.
<table>
<tr><td>H04W 4/00</td><td>(2009.01)</td></tr>
<tr><td>H04W 48/06</td><td>(2009.01)</td></tr>
<tr><td>H04W 74/00</td><td>(2009.01)</td></tr>
<tr><td>H04W 72/04</td><td>(2009.01)</td></tr>
<tr><td>H04W 76/02</td><td>(2009.01)</td></tr>
<tr><td>H04W 48/08</td><td>(2009.01)</td></tr>
<tr><td>H04W 48/18</td><td>(2009.01)</td></tr>
<tr><td>H04W 28/02</td><td>(2009.01)</td></tr>
<tr><td>H04W 48/12</td><td>(2009.01)</td></tr>
<tr><td>H04W 36/00</td><td>(2009.01)</td></tr>
<tr><td>H04W 4/02</td><td>(2009.01)</td></tr>
<tr><td>H04W 8/00</td><td>(2009.01)</td></tr>
<tr><td>H04W 52/34</td><td>(2009.01)</td></tr>
<tr><td>H04W 56/00</td><td>(2009.01)</td></tr>
<tr><td>H04B 17/318</td><td>(2015.01)</td></tr>
<tr><td>H04W 74/08</td><td>(2009.01)</td></tr>
<tr><td>H04W 72/08</td><td>(2009.01)</td></tr>
<tr><td>H04W 8/06</td><td>(2009.01)</td></tr>
<tr><td>H04W 8/18</td><td>(2009.01)</td></tr>
<tr><td>H04W 60/00</td><td>(2009.01)</td></tr>
<tr><td>H04W 60/02</td><td>(2009.01)</td></tr>
<tr><td>H04J 3/16</td><td>(2006.01)</td></tr>
<tr><td>H04W 28/08</td><td>(2009.01)</td></tr>
<tr><td>H04W 92/20</td><td>(2009.01)</td></tr>
<tr><td>H04W 84/12</td><td>(2009.01)</td></tr>
<tr><td>H04W 88/08</td><td>(2009.01)</td></tr>
<tr><td>H04L 5/00</td><td>(2006.01)</td></tr>
<tr><td>H04W 88/02</td><td>(2009.01)</td></tr>
<tr><td>H04W 88/16</td><td>(2009.01)</td></tr>
<tr><td>H04B 7/0413</td><td>(2017.01)</td></tr>
<tr><td>H04W 8/04</td><td>(2009.01)</td></tr>
</table>

(52) U.S. Cl.
CPC ........... *H04L 5/0007* (2013.01); *H04W 4/003* (2013.01); *H04W 4/008* (2013.01); *H04W 4/02* (2013.01); *H04W 4/023* (2013.01); *H04W 8/005* (2013.01); *H04W 8/06* (2013.01); *H04W 8/183* (2013.01); *H04W 24/10* (2013.01); *H04W 28/0215* (2013.01); *H04W 28/08* (2013.01); *H04W 36/0055* (2013.01); *H04W 48/06* (2013.01); *H04W 48/08* (2013.01); *H04W 48/12* (2013.01); *H04W 48/18* (2013.01); *H04W 52/346* (2013.01); *H04W 56/001* (2013.01); *H04W 56/002* (2013.01); *H04W 60/00* (2013.01); *H04W 60/02* (2013.01); *H04W 72/048* (2013.01); *H04W 72/0453* (2013.01); *H04W 72/0486* (2013.01); *H04W 72/085* (2013.01); *H04W 74/004* (2013.01); *H04W 74/0833* (2013.01); *H04W 76/02* (2013.01); *H04W 76/023* (2013.01); *H04W 76/025* (2013.01); *H04W 76/027* (2013.01); *H04W 76/028* (2013.01); *H04B 7/0413* (2013.01); *H04L 5/001* (2013.01); *H04L 5/0098* (2013.01); *H04W 8/04* (2013.01); *H04W 84/12* (2013.01); *H04W 88/02* (2013.01); *H04W 88/08* (2013.01); *H04W 88/16* (2013.01); *H04W 92/20* (2013.01)

(58) Field of Classification Search
CPC . H04W 74/00; H04W 48/12; H04W 72/0406; H04W 72/0453; H04L 5/14
See application file for complete search history.

(56) References Cited

U.S. PATENT DOCUMENTS

<table>
<tr><td>9,210,675 B2</td><td>12/2015</td><td>Dinan</td><td></td></tr>
<tr><td>9,258,747 B2</td><td>2/2016</td><td>Sivanesan et al.</td><td></td></tr>
<tr><td>9,374,151 B2</td><td>6/2016</td><td>Xiong et al.</td><td></td></tr>
<tr><td>9,554,305 B2</td><td>1/2017</td><td>Moustafa et al.</td><td></td></tr>
<tr><td>9,648,514 B2</td><td>5/2017</td><td>Blankenship et al.</td><td></td></tr>
<tr><td>9,674,852 B2</td><td>6/2017</td><td>Heo</td><td></td></tr>
<tr><td>2003/0013443 A1</td><td>1/2003</td><td>Willars et al.</td><td></td></tr>
<tr><td>2007/0291733 A1</td><td>12/2007</td><td>Doran et al.</td><td></td></tr>
<tr><td>2008/0080428 A1</td><td>4/2008</td><td>Jappila et al.</td><td></td></tr>
<tr><td>2008/0205379 A1</td><td>8/2008</td><td>Naqvi</td><td></td></tr>
<tr><td>2009/0016249 A1</td><td>1/2009</td><td>Li et al.</td><td></td></tr>
<tr><td>2009/0270098 A1</td><td>10/2009</td><td>Gallagher et al.</td><td></td></tr>
<tr><td>2011/0080825 A1</td><td>4/2011</td><td>Dimou et al.</td><td></td></tr>
<tr><td>2011/0164562 A1</td><td>7/2011</td><td>Qiu et al.</td><td></td></tr>
<tr><td>2011/0280212 A1</td><td>11/2011</td><td>Lv</td><td></td></tr>
<tr><td>2012/0020291 A1</td><td>1/2012</td><td>Nasielski et al.</td><td></td></tr>
<tr><td>2012/0063298 A1</td><td>3/2012</td><td>Yi et al.</td><td></td></tr>
<tr><td>2012/0088498 A1</td><td>4/2012</td><td>Xiao et al.</td><td></td></tr>
<tr><td>2012/0202557 A1</td><td>8/2012</td><td>Olofsson et al.</td><td></td></tr>
<tr><td>2012/0218970 A1</td><td>8/2012</td><td>Westberg et al.</td><td></td></tr>
<tr><td>2012/0236776 A1</td><td>9/2012</td><td>Zhang et al.</td><td></td></tr>
<tr><td>2012/0276897 A1</td><td>11/2012</td><td>Kwon et al.</td><td></td></tr>
<tr><td>2012/0327821 A1</td><td>12/2012</td><td>Lin et al.</td><td></td></tr>
<tr><td>2012/0327894 A1</td><td>12/2012</td><td>Axmon et al.</td><td></td></tr>
<tr><td>2013/0022023 A1</td><td>1/2013</td><td>Aydin</td><td></td></tr>
<tr><td>2013/0023269 A1</td><td>1/2013</td><td>Wang et al.</td><td></td></tr>
<tr><td>2013/0044690 A1*</td><td>2/2013</td><td>Shaheen</td><td>H04W 36/0094<br>370/328</td></tr>
<tr><td>2013/0051507 A1</td><td>2/2013</td><td>Jantunen et al.</td><td></td></tr>
<tr><td>2013/0109301 A1</td><td>5/2013</td><td>Hakola et al.</td><td></td></tr>
<tr><td>2013/0121249 A1</td><td>5/2013</td><td>Ji et al.</td><td></td></tr>
<tr><td>2013/0183963 A1</td><td>7/2013</td><td>Turtinen et al.</td><td></td></tr>
<tr><td>2013/0183974 A1</td><td>7/2013</td><td>Johansson et al.</td><td></td></tr>
<tr><td>2013/0332559 A1</td><td>12/2013</td><td>Mas Ivars et al.</td><td></td></tr>
<tr><td>2014/0148174 A1</td><td>5/2014</td><td>Teyeb et al.</td><td></td></tr>
<tr><td>2014/0219248 A1</td><td>8/2014</td><td>Reddiboyana et al.</td><td></td></tr>
<tr><td>2014/0242963 A1</td><td>8/2014</td><td>Novlan et al.</td><td></td></tr>
<tr><td>2014/0301305 A1</td><td>10/2014</td><td>Xu et al.</td><td></td></tr>
<tr><td>2014/0335869 A1</td><td>11/2014</td><td>Choi et al.</td><td></td></tr>
<tr><td>2015/0043420 A1</td><td>2/2015</td><td>Xiong et al.</td><td></td></tr>
<tr><td>2015/0049707 A1</td><td>2/2015</td><td>Vajapeyam et al.</td><td></td></tr>
<tr><td>2015/0078335 A1</td><td>3/2015</td><td>Sivanesan et al.</td><td></td></tr>
<tr><td>2015/0117183 A1</td><td>4/2015</td><td>Heo et al.</td><td></td></tr>
<tr><td>2015/0195750 A1</td><td>7/2015</td><td>Sivanesan et al.</td><td></td></tr>
<tr><td>2015/0195865 A1</td><td>7/2015</td><td>Lee et al.</td><td></td></tr>
<tr><td>2015/0207672 A1</td><td>7/2015</td><td>Xu et al.</td><td></td></tr>
<tr><td>2015/0223258 A1</td><td>8/2015</td><td>Jung et al.</td><td></td></tr>
<tr><td>2015/0244429 A1</td><td>8/2015</td><td>Zhang et al.</td><td></td></tr>
<tr><td>2015/0263836 A1</td><td>9/2015</td><td>Kim</td><td></td></tr>
<tr><td>2015/0312005 A1*</td><td>10/2015</td><td>Huang</td><td>H04W 72/0453<br>370/280</td></tr>
<tr><td>2015/0327162 A1</td><td>11/2015</td><td>Lee et al.</td><td></td></tr>
<tr><td>2015/0373609 A1</td><td>12/2015</td><td>Kim et al.</td><td></td></tr>
<tr><td>2016/0044567 A1</td><td>2/2016</td><td>Baghel et al.</td><td></td></tr>
<tr><td>2016/0219541 A1</td><td>7/2016</td><td>Chatterjee et al.</td><td></td></tr>
<tr><td>2016/0227580 A1</td><td>8/2016</td><td>Xiong et al.</td><td></td></tr>
<tr><td>2016/0234847 A1</td><td>8/2016</td><td>Zhang et al.</td><td></td></tr>
<tr><td>2016/0242128 A1</td><td>8/2016</td><td>Loehr et al.</td><td></td></tr>
<tr><td>2016/0249259 A1</td><td>8/2016</td><td>Park et al.</td><td></td></tr>
<tr><td>2016/0255602 A1</td><td>9/2016</td><td>Zaus</td><td></td></tr>
<tr><td>2016/0255615 A1</td><td>9/2016</td><td>Chatterjee et al.</td><td></td></tr>
</table>

(56) References Cited

U.S. PATENT DOCUMENTS

2016/0295614 A1 10/2016 Lee et al.
2016/0359548 A1 12/2016 Xiong

FOREIGN PATENT DOCUMENTS

| | | | |
|---|---|---|---|
| CN | 105556994 A | 5/2016 | |
| CN | 105557051 A | 5/2016 | |
| CN | 105557052 A | 5/2016 | |
| CN | 105594140 A | 5/2016 | |
| CN | 105594266 A | 5/2016 | |
| CN | 105612786 A | 5/2016 | |
| CN | 106411490 A | 2/2017 | |
| EP | 2472950 A1 | 7/2012 | |
| EP | 3031147 A1 | 6/2016 | |
| EP | 3047679 A1 | 7/2016 | |
| EP | 3063883 A1 | 9/2016 | |
| EP | 3063982 A1 | 9/2016 | |
| EP | 3064012 A1 | 9/2016 | |
| HK | 1221826 A | 6/2017 | |
| JP | 2010258715 A | 11/2010 | |
| JP | 2016531533 A | 10/2016 | |
| KR | 1020090124788 A | 12/2009 | |
| KR | 1020110038571 A | 4/2011 | |
| KR | 1020160039235 A | 4/2016 | |
| WO | WO-2012150815 A2 | 11/2012 | |
| WO | WO-2012159270 A1 | 11/2012 | |
| WO | WO-2013104413 A1 | 7/2013 | |
| WO | WO-2013108048 A1 | 7/2013 | |
| WO | WO-2015021320 A1 | 2/2015 | |
| WO | WO-2015042100 A1 | 3/2015 | |
| WO | WO-2015065619 A1 | 5/2015 | |
| WO | WO-2015065768 A1 | 5/2015 | |
| WO | WO-2015065881 A1 | 5/2015 | |
| WO | WO-2015065947 A1 | 5/2015 | |
| WO | WO-2015066281 A1 | 5/2015 | |
| WO | WO-2015066476 A1 | 5/2015 | |

OTHER PUBLICATIONS

"U.S. Appl. No. 14/491,639, Non Final Office Action dated Apr. 8, 2016", 16 pgs.
"U.S. Appl. No. 14/491,639, Response filed Aug. 8, 2016 to Non Final Office Action dated Apr. 8, 2016", 9 pgs.
"U.S. Appl. No. 14/659,655, Final Office Action dated May 20, 2016", 10 pgs.
"U.S. Appl. No. 14/659,655, Notice of Allowance dated Aug. 3, 2016", 8 pgs.
"U.S. Appl. No. 14/659,655, Response filed Apr. 20, 2016 to Non Final Office Action dated Jan. 21, 2016", 31 pgs.
"Indian Application Serial No. 201647004844, Voluntary Amendment filed Aug. 3, 2016", 14 pgs.
"International Application Serial No. PCT/US2014/056003, International Preliminary Report on Patentability dated Mar. 31, 2016", 7 pgs.
"International Application Serial No. PCT/US2014/056909, International Preliminary Report on Patentability dated May 12, 2016", 6 pgs.
"International Application Serial No. PCT/US2014/061569, International Preliminary Report on Patentability dated May 12, 2016", 8 pgs.
"International Application Serial No. PCT/US2014/062349, International Preliminary Report on Patentability dated May 12, 2016", 10 pgs.
"International Application Serial No. PCT/US2014/062533, International Preliminary Report on Patentability dated May 12, 2016", 8 pgs.
"International Application Serial No. PCT/US2014/063080, International Preliminary Report on Patentability dated May 12, 2016", 7 pgs.
"International Application Serial No. PCT/US2014/063434, International Preliminary Report on Patentability dated May 12, 2016", 10 pgs.

"[Draft] LS on KeNB* generation in case of MFBI", R2-131153, 3GPP TSG RAN WG2 Meeting #80 bis, (May 24, 2013), 1 pg.
"U.S. Appl. No. 14/279,562, Notice of Allowance dated Sep. 4, 2015", 9 pgs.
"U.S. Appl. No. 14/311,938, Examiner Interview Summary dated Jan. 22, 2016", 3 pgs.
"U.S. Appl. No. 14/311,938, Non Final Office Action dated Nov. 2, 2015", 14 pgs.
"U.S. Appl. No. 14/311,938, Notice of Allowance dated Feb. 29, 2016", 5 pgs.
"U.S. Appl. No. 14/311,938, Response filed Jan. 18, 2016 to Non Final Office Action dated Nov. 2, 2015", 7 pgs.
"U.S. Appl. No. 14/659,655, Non Final Office Action dated Jan. 21, 2016", 10 pgs.
"U.S. Appl. No. 14/659,655, Preliminary Amendment filed Mar. 18, 2015", 47 pgs.
"Comparison of the UP Alternatives", R2-132338, 3GPP TSG-RAN WG2 Meeting #83, Barcelona, Spain, NSN, Nokia Corporation, NTT DOCOMO, Inc., Samsung, (Aug. 2013), 5 pgs.
"Data split options and considerations on U-plane protocol architecture for dual-connectivity", R2-131054, 3GPP TSG-RAN WG2 Meeting #81bis, Chicago, USA Nokia Siemens Networks, (Apr. 2013), 9 pgs.
"Discussion on Multi-level Prach Coverage Enhancement", R1-140616 3GPP TSG RAN WG1 Meeting #76 NTT DOCOMO, (Feb. 2014), 1-6.
"Evolved Universal Terrestrial Radio Access (E-UTRA); Multiplexing and channel coding", 3GPP TS 36.212 version 8.8.0 Release 8 LTE, (Jan. 2010), 62 pgs.
"Evolved Universal Terrestrial Radio Access (E-UTRA); Physical channels and modulation", 3GPP TS 36.211 version 9.1.0 Release 9 LTE, (Apr. 2010), 87 pgs.
"Evolved Universal Terrestrial Radio Access (E-UTRA); Physical layer procedures", 3GPP TS 36.213 V11.0.0 3rd Generation Partnership Project; Technical Specification Group Radio Access Network;, (Sep. 2012), 143 pgs.
"Evolved Universal Terrestrial Radio Access (E-UTRA); Radio Resource Control (RRC); Protocol specification", 3GPP TS 36.331 version 8.6.0 Release 8 ETSI, (Jul. 2009), 211 pgs.
"Further considerations on MTC coverage enhancement", Motorola Mobility, R1-132467, 3GPP TSG RAN WG1 Meeting #73, Fukuoka, Japan, (May 20-24, 2013), 1-3.
"Further discussion on resource allocation for D2D discovery", R1-134116 3GPP TSG RAN WG1 Meeting #74bis CATT, (Oct. 11, 2013), 1-6.
"Impacts of Splitting a Single EPS Bearer between Two (or more) eNBs", R2-131401, 3GPP TSG RAN WG2 Meeting #81bis. Chicago, USA, Intel Corporation, (Apr. 2013), 9 pgs.
"Inter-corresponding sets of resources for D2D discovery", R1-134365 3GPP TSG RAN WG1 Meeting #74bis HTC, (Oct. 11, 2013), 1-2.
"International Application Serial No. PCT/US2014/050214, International Preliminary Report on Patentability dated Feb. 18, 2016", 7 pgs.
"International Application Serial No. PCT/US2014/050214, International Search Report dated Nov. 19, 2014", 4 pgs.
"International Application Serial No. PCT/US2014/050214, Written Opinion dated Nov. 19, 2014", 5 pgs.
"International Application Serial No. PCT/US2014/056003, International Search Report dated Dec. 16, 2014", 4 pgs.
"International Application Serial No. PCT/US2014/056003, Written Opinion dated Dec. 16, 2014", 5 pgs.
"International Application Serial No. PCT/US2014/056909, International Search Report dated Dec. 26, 2014", 3 pgs.
"International Application Serial No. PCT/US2014/056909, Written Opinion dated Dec. 26, 2014", 4 pgs.
"International Application Serial No. PCT/US2014/061569, International Search Report dated Jan. 16, 2015", 3 pgs.
"International Application Serial No. PCT/US2014/061569, Written Opinion dated Jan. 16, 2015", 6 pgs.

(56) References Cited

OTHER PUBLICATIONS

"International Application Serial No. PCT/US2014/062349, International Search Report dated Jan. 26, 2015", 4 pgs.
"International Application Serial No. PCT/US2014/062349, Written Opinion dated Jan. 26, 2015", 8 pgs.
"International Application Serial No. PCT/US2014/062533, International Search Report dated Jan. 21, 2015", 3 pgs.
"International Application Serial No. PCT/US2014/062533, Written Opinion dated Jan. 21, 2015", 6 pgs.
"International Application Serial No. PCT/US2014/063080, International Search Report dated Feb. 12, 2015", 4 pgs.
"International Application Serial No. PCT/US2014/063080, Written Opinion dated Feb. 12, 2015", 5 pgs.
"International Application Serial No. PCT/US2014/063434, International Search Report dated Feb. 16, 2015", 4 pgs.
"International Application Serial No. PCT/US2014/063434, Written Opinion dated Feb. 16, 2015", 8 pgs.
"LS on signalling of multiple frequency band indicators; prioritization of frequency bands supported", R2-122009, 3GPP TSG RAN WG2 Meeting #78 Ericsson, (May 25, 2012), 1 pg.
"On MFBI and EARFCN extension", GP-130431 3GPP TSG GERAN#58 Renesas Mobile Europe Ltd.,, (May 2013), 1-5 pgs.
"On Resource Allocation and System Operation for D2D Discovery", R1-135119 3GPP TSG RAN WG1 Meeting #75 Intel Corporation, (Nov. 15, 2013), 1-6.
"PBCH Coverage Enhancement", Qualcomm Inc, RI-131397, 3GPP TSG-RAN WG1 Meeting #72bis, Chicago. USA, [Online]. Retrieved from the Internet: <URL: http://www.3gpp.org/ftp/tsg_ran/WG1_RL1/TSGRI_72b/Docs/R1-131397.zip>, (Apr. 15-19, 2013).
"PBCH Coverage Extension for MTC Devices", ITRI, R1-132256. 3GPP TSG RAN WG1 Meeting #73, Fukuoka. Japan, [Online]. Retrieved from the Internet: <URL: http://www.3gpp.org/ftp/tsg_ran/WG1_RL1/TSGRI_73/Docs/R1-32256.zip>, (May 20-24, 2013), 1-3.
"PBCH coverage improvement for low-cost MTC UEs", CATT, R1-130982, 3GPP TSG-RAN WG1 Meeting #72bis, Chicago, USA, [Online]. Retrieved from the Internet: <URL: http://www.3gpp.org/ftp/tsg_ran/WG1_RL1/TSGRI_72b/Docs/R1-130982.zip>, (Apr. 15-19, 2013), 1-4.
"Physical Random Access Channel Coverage Enhancement", R1-134303 TSG RAN WG1 Meeting #74bis, Guangzhou, China ZTE, (Sep. 28, 2013), 1-16.
"PRACH coverage enhancement for MTC UEs", R1-140278 3GPP TSG RAN WG1 Meeting #76 ZTE, (Feb. 2014), 1-8.
"PRACH resource multiplexing to support low cost MTC and coverage enhancement", R1-140027 3GPP TSG RAN WG1 Meeting #76, (Feb. 2014), 1-6.
"Resource Allocation for D2D Discovery", R1-134232, 3GPP TSG RAN WG1 Meeting #74bis Alcatel-Lucent Shanghai Bell, Alcatel-Lucent, (Oct. 11, 2013), 1-2.
"Uplink scheduling and BSRs with dual connectivity", R2-133412, 3GPP TSG-RAN WG2 Meeting #83bis, Ljubljana,Slovenia Ericsson, (Oct. 2013), 3 pgs.
"3rd Generation Partnership Project; Technical Specification Group Core Network and Terminals; General Packet Radio Service (GPRS); Serving GPRS Support Node (SGSN)—Visitors Location Register (VLR); Gs interface layer 3 specification (Release 11)", 3GPP TS 29.018, V11.6.0, (Mar. 2013), 62 pgs.
"3rd Generation Partnership Project; Technical Specification Group Core Network and Terminals; Mobile radio interface Layer 3 specification; Core network protocols; Stage 3 (Release 11)", 3GPP TS 24.008, V 11.8.0, (Sep. 2013), 677 pgs.
"3rd Generation Partnership Project; Technical Specification Group Core Network and Terminals; Non-Access-Stratum (NAS) protocol for Evolved Packet System (EPS); Stage 3 (Release 11)", 3GPP TS 24.301, V11.8.0, (Sep. 2013), 345 pgs.
"3rd Generation Partnership Project; Technical Specification Group Services and System Aspects; Circuit Switched (CS) fallback in Evolved Packet System (EPS); Stage 2 (Release 12)", 3GPP Standard; 3GPP TS 23.272, 3rd Generation Partnership Project (3GPP), Mobile Competence Centre, F-06921 Sophia-Antipolis Cedex, (Sep. 11, 2013), 1-97.
"U.S. Appl. No. 14/491,639, Final Office Action dated Oct. 31, 2016", 19 pgs.
"U.S. Appl. No. 14/491,639, Notice of Allowance dated Jan. 20, 2017", 6 pgs.
"U.S. Appl. No. 14/491,639, PTO Response to Rule 312 Communication dated May 11, 2017", 2 pgs.
"U.S. Appl. No. 14/491,639, Response filed Jan. 3, 2017 to Final Office Action dated Oct. 31, 2016", 10 pgs.
"U.S. Appl. No. 14/659,655, Corrected Notice of Allowance dated Dec. 15, 2016", 2 pgs.
"U.S. Appl. No. 14/916,843, Non Final Office Action dated Jun. 23, 2017", 33 pgs.
"U.S. Appl. No. 14/917,154, Non Final Office Action dated Jun. 29, 2017", 7 pgs.
"U.S. Appl. No. 15/026,174, Non Final Office Action dated May 19, 2017", 15 pgs.
"U.S. Appl. No. 15/186,832, Preliminary Amendment filed Aug. 17, 2016", 8 pgs.
"Backwards compatibility issues with the approved CRs 24.301-1532r1 (C1-123946) and 24.008-2296r1(C1-124701)", 3GPP Draft; C1-132127-Discussion-Periodic-Update. 3rd Generation Partnership Project, Retrieved from the Internet: URL: <http://www.3gpp.org/ftp/tsg ct/WG1_mm-cc-sm_ex-CN1/TSGC1_83_Chengdu/docs/>, (May 13, 2013), 3 pgs.
"Beacon Channel Design for D2D,", Ericsson, 3GPP TSG-RAN WG1#74b R1-134723, 3GPP, (Sep. 27, 2013), 8 pgs.
"Chinese Application Serial No. 201480051969.X, Voluntary Amendment Filed on Jun. 28, 2017", (W/ English Claims), 22 pgs.
"Chinese Application Serial No. 2016-544365, Office Action dated Mar. 14, 2017", w. English Translation, 10 pgs.
"Clarification of ISR activation condition for NMO II RAU and Periodic RAU", 3GPP Draft; S2-120327 REV4-S2-120098 23272CR0720 CSFB RAU and ISR REL8 REV04. 3rd Generation Partnership Project (3GPP), Mobile, (Jan. 24, 2012), 2 pgs.
"Clarification of ISR activation condition for Periodic RAU", 3GPP Draft; S2-120097 Clarification of ISR Activation Disc, 3rd-Generation Partnership Project, Mobile Competence Centr, (Jan. 11, 2012), 5 pgs.
"Coverage enhancement of PRACH for low cost MTC", Intel Corporation: 3GPP Draft; RI-135104 Intel MTC PRACH, 3rd Generation Partnership Project (3GPP), Mobile Competence Centre ; 650, Route Des Lucioles ; F-06921 Sophia-Antipolis Cedex ; France, (Nov. 2, 2013), 8 pgs.
"Coverage Improvement for PRACH", Intel Corporation: 3GPP Draft; RI-140115—Intel MTC PRACH 3rd Generation Partnership Project (3GPP),Mobile Competence Centre ; 650, Route Des Lucioles ; F-06921 Sophia-Antipolis Cedex ; France, [Online] Retrieved from the Internet : <http://www.3g pp.org /ftp/tsgran/WGIRLI/TSGRI_76/Docs/>, (Feb. 1, 2014), 9 pgs.
"D2D synchronization—with network coverage", 3GPP TSG-RAN, WG1 Meeting #74bis, R1-134537, (Oct. 11, 2013), 4 pgs.
"Discovery Mode and Data Flow for D2D Discovery", CATT, 3GPP TSG-RAN WG2#83bis R2-133217, 3GPP, (Sep. 27, 2013), 4 pgs.
"Discussion on PRACH Coverage Enhancement for Low Cost MTC", Intel Corporation: 3GPP Draft; R1-132930—Discussion on PRACH Coverage Enhancement for Low Cost MTC, 3rd Generation Partnership Project (3GPP), Mobile Competence Centre ; 650, Route Deslucioles ; F-06921 Sophia-Antipo vol. RAN WG1, no. Barcelona, Spain, (Aug. 10, 2013), 7 pgs.
"Discussion on Resource Allocation for D2D Discovery", ZTE, 3GPP TSG-RAN WG1#74b R1-134309, 3GPP, (Sep. 28, 2013), 11 pgs.
"European Application Serial No. 14834710.7, Extended European Search Report dated Mar. 22, 2017", 9 pgs.
"European Application Serial No. 14856919.7, Extended European Search Report dated May 17, 2017", 8 pgs.

(56) References Cited

OTHER PUBLICATIONS

"European Application Serial No. 14857392.6, Extended European Search Report dated Jun. 20, 2017", 10 pgs.
"European Application Serial No. 14858430.3, Extended European Search Report dated Mar. 7, 2017", 9 pgs.
"European Application Serial No. 14858666.2, Extended European Search Report dated Mar. 7, 2017", 8 pgs.
"European Application Serial No. 14858860.1, Extended European Search Report dated Mar. 28, 2017", 9 pgs.
"European Application Serial No. 14859145.6, Extended European Search Report dated Mar. 22, 2017", 8 pgs.
"Further discussion on CSFB with ISR", 3GPP Draft; S2-120825 was S2-120739 CSFB ISR Periodicr, 3rd Generation Partnership Project, Mobile Competence Centr, (Feb. 3, 2012), 26 pgs.
"HiSilicon", Huawei,D2D discovery message size, 3GPP TSG-RAN WG1#74b R1-134075, 3GPP, (Sep. 28, 2013), 4 pgs.
"Japanese Application Serial No. 2016-516873, Office Action dated Feb. 7, 2017", (W/ English Translation), 10 pgs.
"Japanese Application Serial No. 2016-516873, Response Filed Apr. 28, 2017 to Office Action dated Feb. 7, 2017", (W/ English Claims), 15 pgs.
"Korean Application Serial No. 10- 2016-7008440, Voluntary Amendment Filed on Jul. 3, 2017", (W/ English Claims), 26 pgs.
"LS on KeNB* generation in case of MFB", TSG RAN WG2: 3GPP Draft; R2-132224 (Reply LS on KeNB and MFBI), 3rd Generation Partnership Project (3GPP), Mobile Competence Centre ; 650, Route Des Lucioles ; F-06921 Sophia-Antipolis Cedex ; France, vol. RAN WG2, no. Fukuoka, Japan, (May 23, 2013), 2 pgs.
"On D2D Discovery Transmission Timing", Intel Corporation, 3GPP Draft; R1-135121-Intel-Discovery Transmission Timing, 3rd Generation Partnership Project (3GPP), Mobile Competence Centre ; 650, Route Des Lucioles ; F-06921 Sophia-Antipolis Cedex ; France,, [Online] retrieved from the internet: <:http://www.3gpp.org/ftp/tsg_ran/WG1_RL1/TSGR1_75/Docs/>, 7 pgs.
"On MFBI and EARFCN extension", Renesas Mobile Europe Ltd: 3GPP Draft; GP-130569, 3rd Generation Partnership Project (3GPP), Mobile Competence Centre ; 650, Route Deslucioles ; F-06921 Sophia-Antipolis Cedex; France vol. TSG GERAN, no. Sofia, Bulgaria, (Aug. 21, 2013), 1-5.
"On Resource Allocation and System Operation for D2D Discovery", Intel Corporation, 3GPP Draft; R1-134141—Intel—Discovery Resource Allocation, Centre ; 650, Route Des Lucioles ; F-06921 Sophia-Antipolis Cedex ; France vol. RAN WG1, no. Guangzhou, China; Oct. 7, 2013-Nov. 28, 2013, [Online] retrieved from the internet: <:http://www.3gpp.org/ftp/tsg_ran/WG1_RL1/TSGR1_74b/Docs/>, (Oct. 11, 2013), 10 pgs.
"On Support of Inter-cell D2D Discovery", Intel Corporation, 3GPP Draft; R1-140135-Intel-Inter-Cell Discovery,3rd Generation Partnership Project (3GPP),Mobile Competence Centre ; 650, Route Deslucioles ; F-06921 Sophia-Antipolis Cedex ; France, [Online] retrieved from the internet: <:http://www.3gpp.org/ftp/tsg_ran/WG1_RL1/TSGR1_76/Docs/>, (Feb. 1, 2014), 6 pgs.
"Remaining details of D2D discovery resource allocation", Intel Corporation, 3GPP Draft; R1-143766_Intel_Disc0veryra, 3rd Generation Partnership Project (3GPP), Mobile Competence Centre ; 650, Route Des Lucioles ; F-06921 Sophia-Antipolis Cedex ; France, XP050875087, [Online] retrieved from the internet: <:http://www.3gpp.org/ftp/Meetings_3GPP_SYNC/RAN1/Docs/>, (Oct. 5, 2014), 8 pgs.

"Resource allocation for D2D communication", CATT, 3GPP TSG-RAN WG1#74b R1-134113, 3GPP, (Sep. 28, 2013), 2 pgs.
"Resource allocation for D2D discovery", Alcatel-Lucent Shanghai Bell, Alcatel-Lucent, 3GPP TSG-RAN WG1#74b R1-134232, 3GPP, (Sep. 28, 2013), 2 pgs.
"Resource allocation for D2D discovery", Intel Corporation, 3GPP TSG-RAN WG2#83bis R2-133512, 3GPP, (Sep. 28, 2013), 4 pgs.
Alacatel, Lucent, "Feasibility of coverage extension of physical Channels for MTC devices", 3GPP Draft; R1-130462—REL-12 MTC Coverage—Coverage Ext PHY Channels V0.3, 3rd Generation Partnership Project (3GPP), Mobile Competence Centre ; 650, Route Des Lucioles ; F-06921 Sophia-Antipolis C, [Online] retrieved from the internet: <http://www.3gpp.org/ftp/tsg_ran/WG1_RL1/TSGR1_72/Docs/>, (Jan. 19, 2013), 7 pgs.
Asustek, "Method of resource allocation for D2D discovery", 3GPP Draft; RI-134638 Method of Resource Allocation for D2D Discovery, $3^{rd}$ Generation Partnership Project (3GPP), Mobile Competence Centre ; 650, Route Des Lucioles ; F-06921 Sophia-Antipolis Cedex, XP050717720, [Online] retrieved from the internet: <:http://www.3gpp.org/ftp/tsg_ran/WGI_RLI/TSGRI_74b/Docs/>, (Sep. 28, 2013), 9 pgs.
Ericsson, et al., "Coverage enhancements for MTC—System informa", 3GPP Draft; R1-131680 Coverage Enhancements for MTC System Information, 3rd Generation Partnership Project (3GPP), Mobile Competence Centre ; 650, Route Des Lucioles ; F-06921 Sophia-Antipolis Cedex, [Online] retrieved from the internet: <http ://www.3gpp.org/ftp/tsg_ran/WG 1 _RL1 /TSG R1 _72b/Docs/>, (Apr. 16, 2013), 8 pgs.
Huawei, et al., "Discussion on PRACH coverage improvement and mechanism for determining the amount of needed coverage improvement", 3GPP Draft; RI-134054, 3rd Generation Partnership Project (3GPP), Mobile Competence Centre ; 650, Route Des Lucioles ; F-06921 Sophia-Antipolis Cedex, (Sep. 28, 2013), 6 pgs.
Huawei, et al., "DRB configuration and switch in dual Connectivity", 3GPP Draft; R2-142062, 3rd Generation Partnership Project (3GPP), Mobile Competence Centre ; 650, Route Des Lucioles ; F-06921 Sophia-Antipolis Cedex ; France, vol. .RAN WG2, no. Seoul, South Korea; May 19, 2014-May 23, 2014, [Online] retrieved from the internet: <http://www.3gpp.org/ftp/tsg_ran/WG2_RL2/TSGR2_86/Docs/>, (May 10, 2014), 5 pgs.
Intel Corporation, "On D2D Discovery Transmission Timing", 3GPP TSG-RAN, WG1#75, R1-135955, [Online] retrieved from the internet: <http://www.3gpp.org/ftp/tsg_ran/WG1_RL1/TSGR1_75/Docs/R1-135955>, (Nov. 15, 2013), 7 pgs.
Nokia, et al., "D2D Discovery Signal", 3GPP Draft; R1-134538, 3rd Generation Partnershipproject (3GPP), Mobile Competence Centre ; 650,Route Des Lucioles ; F-06921 Sophia-Antipolis-cedex ; France,, [Online] retrieved from the internet: <:http://www.3gpp.org/ftp/tsg_ran/WG1_RL1/TSGR1_74b/Docs/>, (Sep. 28, 2013), 7 pgs.
Rapportuer, "Introduction of Dual Connectivity (RAN3 topics)", 3GPP Draft; R3-141480-DC-STAGE2-01, 3rd Generation Partnership Project (3GPP), Mobile Competence Centre ; 650, Route Des Lucioles ; F-06921 Sophia-Antipolis Cedex; France, vol. RAN WG3, no. Seoul, South Korea; May 19, 2014-May 23, 2014, [Online] retrieved from the internet:<:http://www.3gpp.org/ftp/tsg_ran/WG3_lu/TSGR3_84/Docs/>, (May 24, 2014), 62 pgs.
Tao, Yun Wang, et al., "Method and system for processing joint position service Gs interface fault", (Aug. 13, 2008), 6 pgs.

* cited by examiner

SIGNALING EXTENDED EARFCN AND E-UTRA BANDS IN UMTS NETWORKS

PRIORITY CLAIM

This application is a U.S. National Stage Filing under 35 U.S.C. 371 from International Application No. PCT/US2014/063434, filed on Oct. 31, 2014, and published as WO 2015/066476 on May 7, 2015, which claims priority to U.S. Provisional Patent Application Ser. No. 61/898,425 filed Oct. 31, 2013, which are incorporated herein by reference in their entirety.

TECHNICAL FIELD

Embodiments pertain to wireless communications. Some embodiments relate to cellular communication networks including long-term evolution (LTE) networks and universal mobile telecommunications system (UMTS) networks. Some embodiments relate to multiple frequency band indicator (MFBI) signaling to support extended value ranges of evolved absolute radio frequency channel numbers (EARFCNs) and evolved Universal Terrestrial Radio Access (E-UTRA) frequency bands in UMTS.

BACKGROUND

Multiple Frequency Band Indicator (MFBI) signaling was introduced recently in 3rd Generation Partnership Project (3GPP) standards to allow elements of a cell, such as a Node-B or evolved Node-B (eNodeB) to broadcast in more than one band if the absolute frequency of the cell fell into multiple overlapping bands. However, there are ambiguities and signaling inefficiency concerns regarding MFBI support in universal mobile telecommunications system (UMTS) networks.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
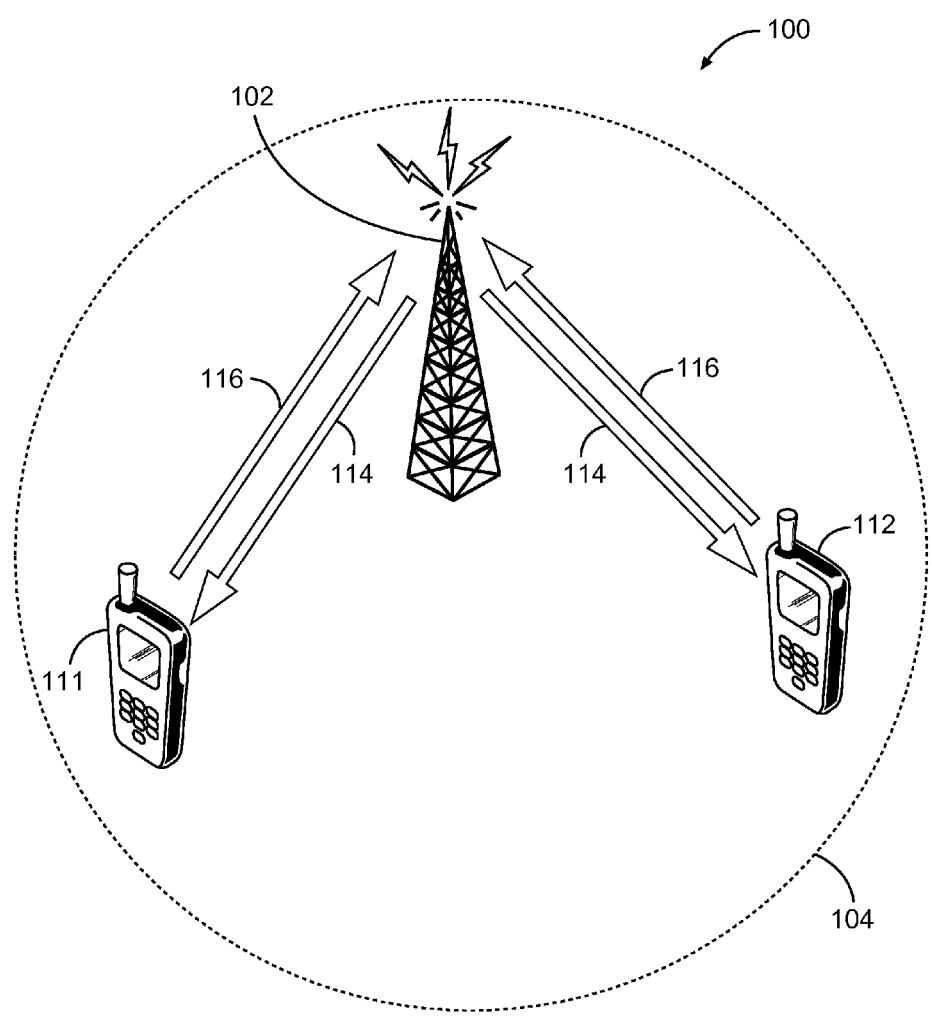
FIG. 1 is a functional diagram of a 3GPP network in accordance with some embodiments.

FIG. 1 shows a wireless communication network 100, according to some embodiments described herein. The wireless communication network 100 may include a Node-B 102, and user equipment (UEs) 111 and 112. Node-B 102 and UEs 111 and 112 may operate to wirelessly communicate with each other in the wireless communication network 100. While some embodiments herein are described regarding a Node-B 102 operating in accordance with 3rd Generation Partnership Project (3GPP) Universal Mobile Telecommunications System (UMTS) systems, other embodiments can be applicable to systems operating in accordance with standards for 3GPP Long Term Evolution (LTE). The term "Node-B" should be understood as a simplification that references the combination of Node-B elements (e.g., radio frequency (RF), physical layer (PHY), and parts of a medium access control layer (MAC) sublayer) and Radio Network Controller (RNC) elements (e.g., parts of a MAC sublayer, RLC, PDCP and Radio Resource Control (RRC)) in accordance with UMTS standards.

The wireless communication network 100 can include a universal terrestrial radio access network (UTRAN) using 3GPP-UMTS standards operating in time division duplex (TDD) mode, frequency division duplex (FDD), or dual-mode operation. The wireless communication network 100 can further support an evolved UTRAN (EUTRAN) using 3GPP LTE standards operating in TDD mode or in FDD mode. Additional examples of wireless communication network 100 include Worldwide Interoperability for Microwave Access (WiMax) networks, 3rd generation (3G) networks, Wi-Fi networks, and other wireless data communication networks.

Examples of UEs 111 and 112 include cellular telephones (e.g., smartphones), tablets, e-readers (e.g., e-book readers), laptops, desktops, personal computers, servers, personal digital assistants (PDAs), web appliances, set-top boxes (STBs), network routers, network switches, network bridges, parking meters, sensors, and other devices. Some devices (e.g., parking meters) among these example devices may include machine-type communications (MTC) devices. An MTC device may not need user interaction to initiate communication with the network (e.g., the wireless communication network 100).

The Node-B 102 may operate as a serving Node-B in a geographic area, such as a cell 104 in the wireless communication network 100. FIG. 1 shows the wireless communication network 100 including only one Node-B (e.g., Node-B 102) as an example. The wireless communication network 100, however, may include multiple Node-Bs (e.g., multiple eNodeBs similar to, or identical to, the Node-B 102), or eNodeBs, etc. Each of the multiple Node-Bs may serve a particular cell in the wireless communication network 100 and may or may not neighbor the Node-B 102.

UEs 111 and 112 may be served by the Node-B 102 in cell 104 (e.g., serving cell 104). UEs 111 and 112 can select cell 104 on which to "camp" to obtain services through the Node-B 102. FIG. 1 shows the wireless communication network 100 including only two UEs (e.g., UEs 111 and 112)

served by the Node-B 102 in the cell 104 as an example. The wireless communication network 100, however, may include more than two UEs served by the Node-B 102. The Node-B 102 and each of the UEs 111 and 112 may operate to communicate with each other using a code division multiple access (CDMA) technique.

The Node-B 102 can communicate with the UEs 111 and 112 on a downlink connection 114 and the UEs 111 and 112 can communicate with the Node-B 102 on an uplink connection 116. The carrier frequency in the uplink 116 and downlink 114 is designated by the absolute radio frequency channel numbers (ARFCN). The UEs 111 and 112, and the Node-B 102 can also each support 3GPP LTE communication. The Node-B 102 can provide system information block (SIB) 19 (SIB-19) signals (e.g., "E-UTRA frequency and priority info list" information elements described later herein) that the UE 111 or 112 shall use for potential cell reselection to LTE.

3GPP Radio Access Network (RAN) working groups have recently introduced support for extended value ranges of evolved ARFCNs (EARFCNs) and E-UTRA frequency bands for long-term evolution (LTE) networks to support the growing demand for E-UTRA frequency bands. The legacy value range for EARFCNs includes values in the range 0-65535, and the legacy value range for E-UTRA operating bands includes values in the range of 1-64. An extended value range for EARFCNs includes values in the range of 65536 to 262143, and an extended value range for E-UTRA operating bands includes values in the range of 65-256, however embodiments should not be understood as being limited to any particular range for EARFCNs or E-UTRA operating bands.

MFBI signaling allows a Node-B, such as the Node-B 102, to broadcast in more than one band if the absolute frequency of the cell 104 falls into multiple overlapping bands. However, ambiguities and inefficiencies remain in MFBI support in some UMTS systems, at least for extended EARFCN ranges and extended E-UTRA operating band ranges that are signaled in radio resource control (RRC) signaling in SIB-19.

Figure 2:
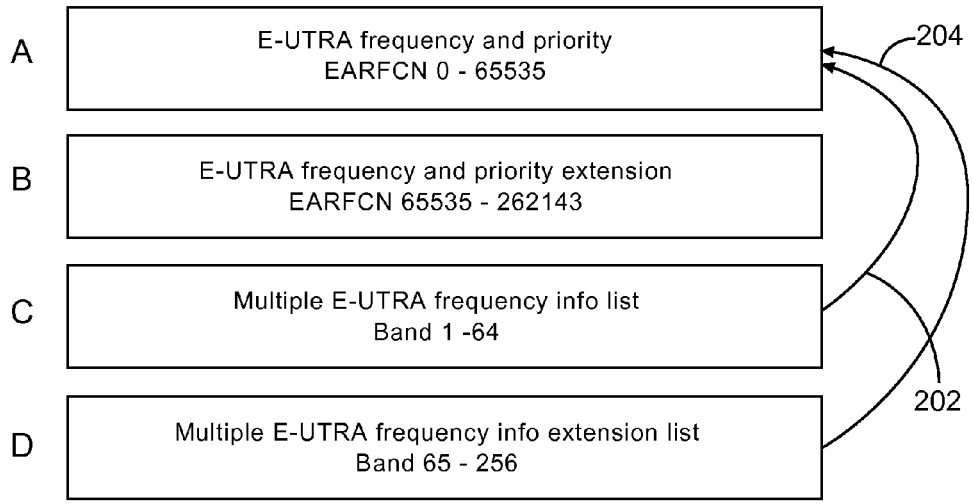
FIG. 2 illustrates a first relationship between evolved absolute radio frequency channel numbers (EARFCNs) and evolved Universal Terrestrial Radio Access (E-UTRA) frequency bands with Multiple Frequency Band Indicator (MFBI) in accordance with some available systems.

For example, according to current RRC specifications, the tabular description given in 3GPP TS 25.331 §10.3.7.115 of the information element (IE) "E-UTRA frequency and priority info list" references different IEs than the procedural description of that IE specified in 3GPP TS 25.331 §8.6.7.3c. The tabular description specifies that each entry of the IE "Multiple E-UTRA frequency info list" and of the IE "Multiple E-UTRA frequency info extension list," corresponds to an entry in the "E-UTRA frequency and priority" IE. This relationship is shown graphically in FIG. 2. As can be seen in FIG. 2, according to the tabular description no MFBI signaling, from either the legacy 202 or the extended 204 E-UTRA frequency band range C and D, is possible for the extended EARFCN range B. It will be understood that FIG. 2 (as well as FIG. 3, described later herein) depicts only the relevant top level IEs of "E-UTRA frequency and priority," "E-UTRA frequency and priority extension," "Multiple E-UTRA frequency info list," and "Multiple E-UTRA frequency info extension list," and the value ranges for EARFCNs and E-UTRA frequency bands covered by those IEs, and that other fields, values or portions of those IEs can be specified in current and future versions of standards of the 3GPP family of standards.

On the other hand, the procedural description given in current versions of 3GPP TS 25.331 §8.6.7.c specifies that:

TABLE 1

3GPP TS 8.6.7.3c (partial)

1>for each occurrence of the IE "E-UTRA frequency and priority": ...
    2> if the UE supports multi-band signalling and if the UE does not recognise the EARFCN in the IE "EARFCN" and the IE "Multiple E-UTRA frequency info list" is present:
        3> if the IE "Multiple E-UTRA frequency band indicator list" is present and the UE supports at least one of the indicated E-UTRA bands:
...
1> if the UEsupports E-UTRA band 65 or higher, for each occurrence of the IE "E-UTRA frequency and priority extension":
...
    2> if the UE supports multi-band signalling and if the UE does not recognise the EARFCN in the IE "EARFCN extension" and the IE "Multiple E-UTRA frequency info extension list" is present:
        3> if the IE "Multiple E-UTRA frequency band indicator extension list" is present and the UE supports at least one of the indicated E-UTRA bands:
...

Figure 3:
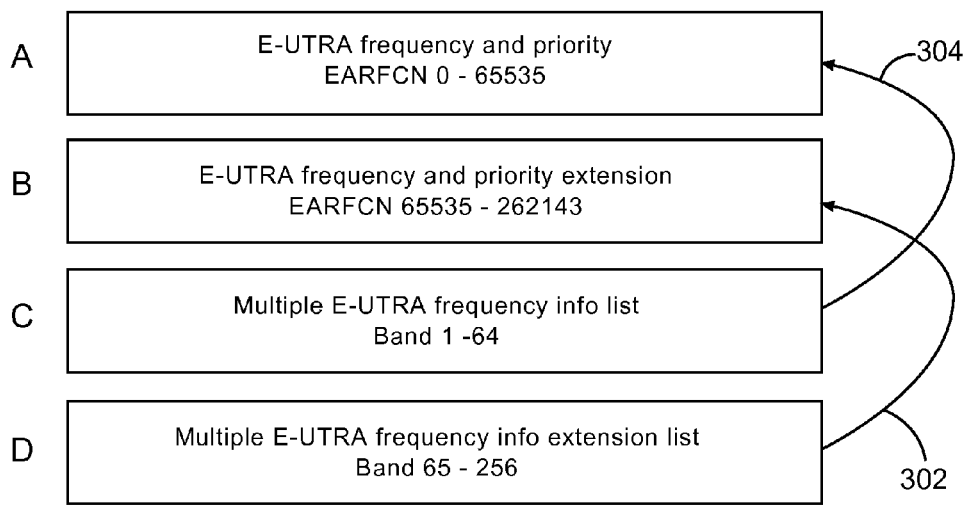
FIG. 3 illustrates a second relationship between EARFCNs and E-UTRA frequency bands with MFBI in accordance with some available systems.

The relationship spelled out in Table 1 between EARFCNs and E-UTRA frequency bands with MFBI is shown graphically in FIG. 3. As can be observed upon examination of FIG. 3, no MFBI signaling 302 from the extended range of E-UTRA frequency bands D is done for the legacy EARFCN range A. Likewise, no MFBI signaling 304 from the legacy range C of E-UTRA frequency bands is done for the extended EARFCN range B. Embodiments provide a signaling relationship, described later herein with respect to FIG. 5, wherein MFBI signaling is provided from the extended range D of E-UTRA frequency bands to both the extended EARFCN range B and the legacy EARFCN range A. Similarly, embodiments provide a signaling relationship, wherein MFBI signaling is provided from the legacy range C of E-UTRA frequency bands to both the extended EARFCN range B and the legacy EARFCN range A.

Figure 4:
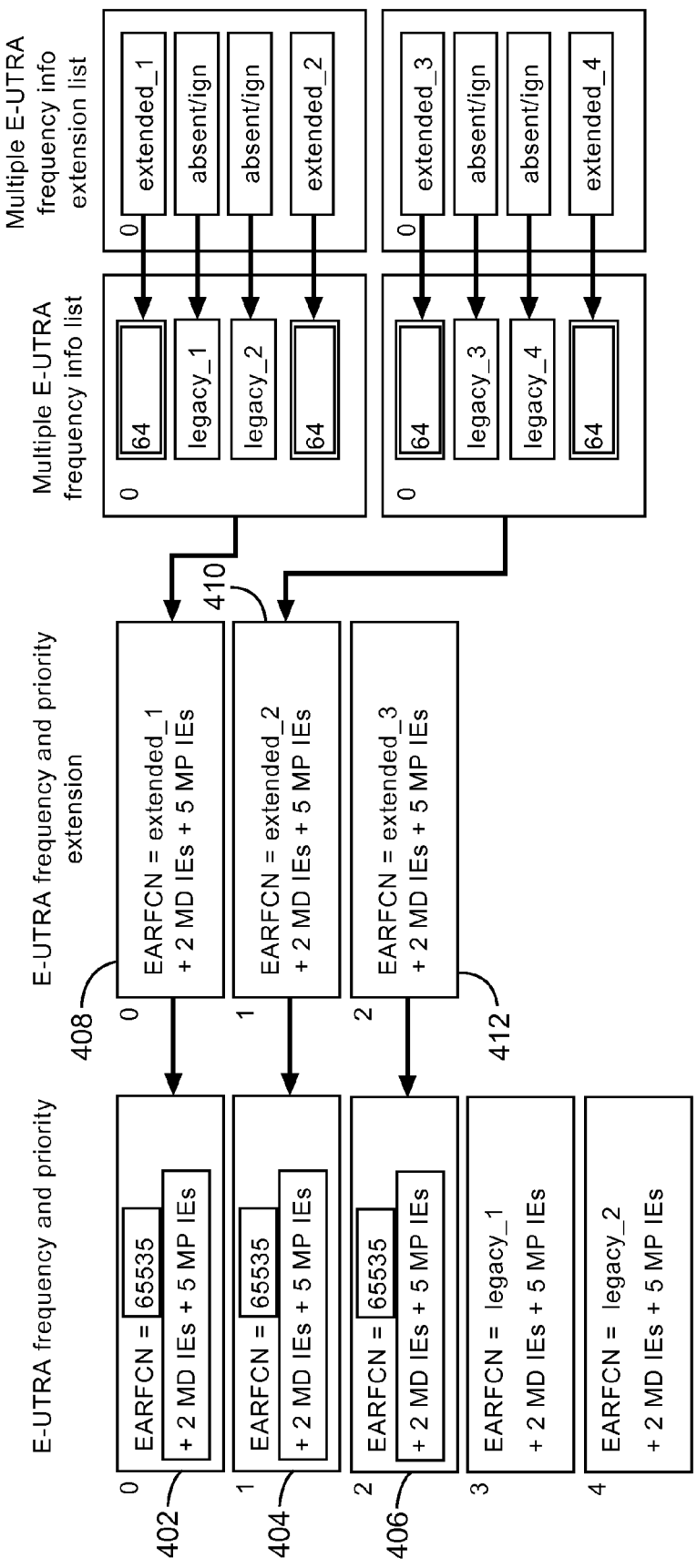
FIG. 4 is a block diagram for illustrating superfluous E-UTRA frequency and priority information elements that may be transmitted in some available systems.

Embodiments also reduce or eliminate the occurrence of superfluous IE signaling. FIG. 4 is a block diagram for illustrating superfluous E-UTRA frequency and priority IEs that may be transmitted in some available systems.

The signaling structure in current versions of 3GPP provide that, if an EARFCN value within the EARFCN extended value range is to be signaled to the UE 111, 112, then the Node-B 102 will indicate this to the UE 111, 112 by using the legacy maximum value of 65535 in the IE "EARFCN," as shown in example blocks 402, 404, and 406, along with other IEs, including two mandatory default (MD) IEs and five mandatory present (MP) IEs. The UE 111, 112 will ignore the legacy value in blocks 402, 404, and 406 and the UE 111, 112 instead uses corresponding extension EARFCNs and IEs in blocks 408, 410, and 412. However, this approach results in wasted signaling to signal the unused IEs. Embodiments reduce or eliminate this superfluous IE signaling according to signaling optimizations described later herein with respect to FIG. 6.

Figure 5:
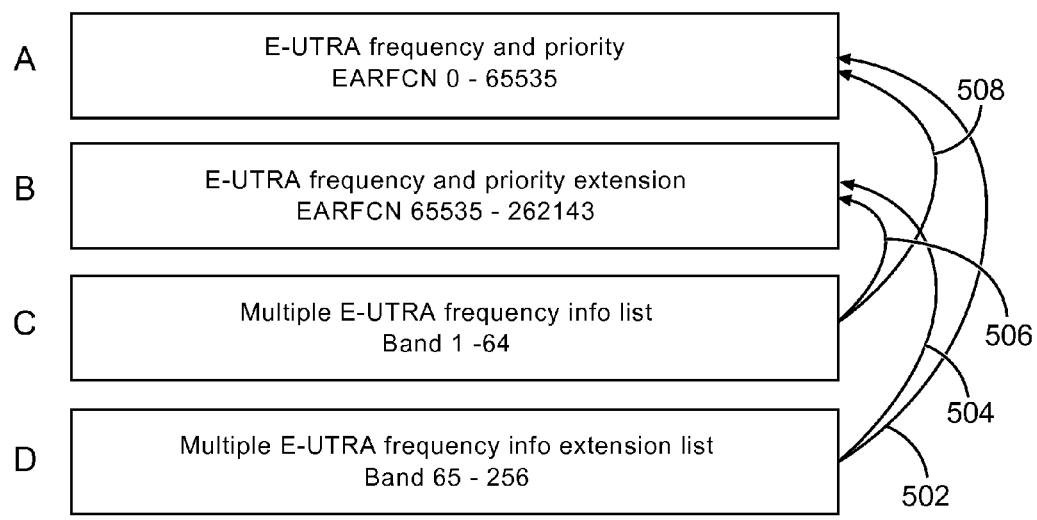
FIG. 5 illustrates a relationship between EARFCNs and E-UTRA frequency bands with MFBI in accordance with some embodiments.

Embodiments provide a signaling relationship as shown in FIG. 5, wherein MFBI signaling 502, 504 is provided from the extended range D of E-UTRA frequency bands to both the extended EARFCN range B and the legacy EARFCN range A. Similarly, MFBI signaling 506, 508 is provided from the legacy range C of E-UTRA frequency bands to both the extended EARFCN range B and the legacy EARFCN range A. A receiving UE 111 or 112 can then merge received signaling according to criteria discussed later herein.

Figure 6:
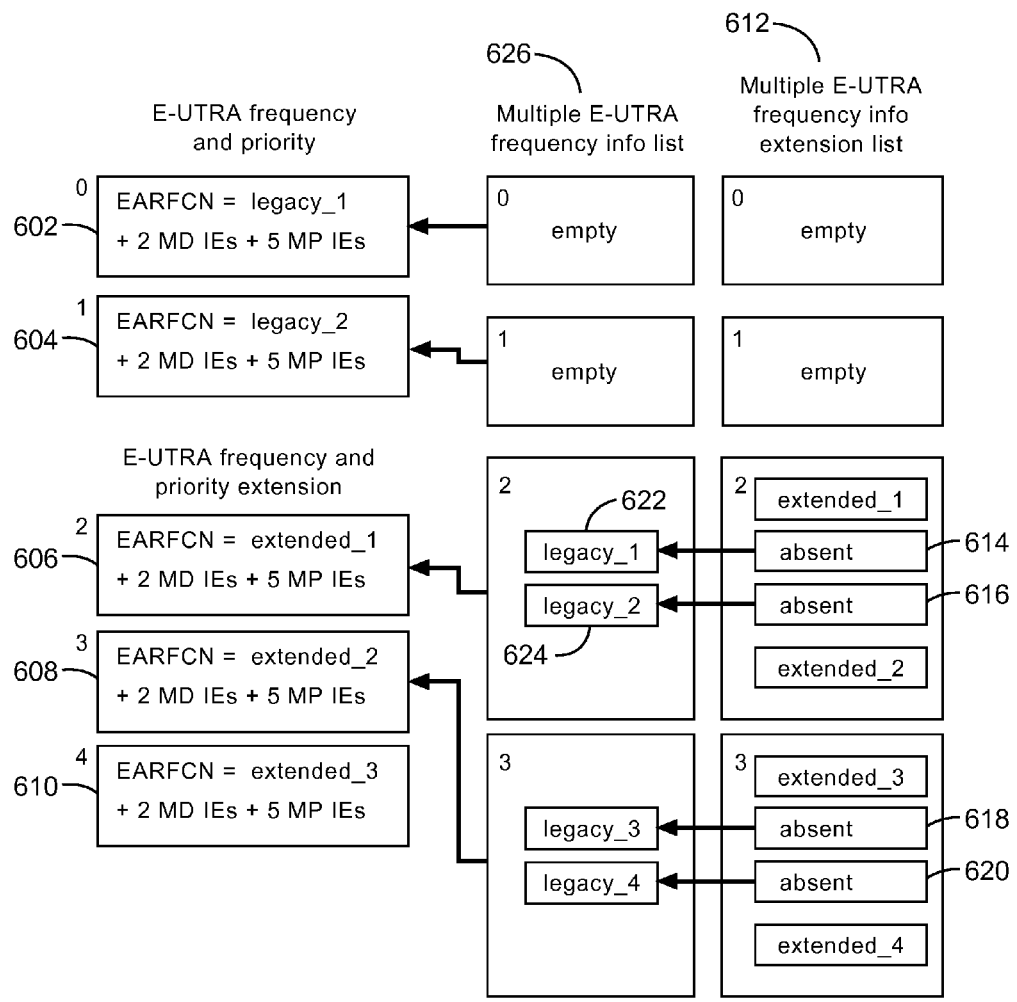
FIG. 6 is a block diagram to illustrate E-UTRA frequency and priority information elements that may be transmitted in accordance with some embodiments.

FIG. 6 is a block diagram to illustrate E-UTRA frequency and priority information elements that may be transmitted in accordance with some embodiments in order to reduce or eliminate extraneous MFBI signaling as briefly described earlier herein.

In embodiments, the Node-B 102 will signal an IE "Number of applicable EARFCN." The UE 111 or 112 will then concatenate the IEs "E-UTRA frequency and priority," illustrated in blocks 602 and 604, and "E-UTRA frequency and priority extension," illustrated by blocks 606, 608, and 610 based on the value signaled in IE "Number of applicable EARFCN." In other words, the value signaled in IE "Number of applicable EARFCN" refers to the number of occurrences of IE "E-UTRA frequency and priority," and the value represented by the IE "maxNumEUTRAFreqs" minus the value specified in IE "Number of applicable EARFCN" refers to the maximum number of occurrences of IE "E-UTRA frequency and priority extension." In the example illustrated in FIG. 6, therefore, it will be understood that "Number of applicable EARFCN" equals 2, so that two "E-UTRA frequency and priority" IEs are used, and the IE "maxNumEUTRAFreqs" is at least five, so that three "E-UTRA frequency and priority extension" IEs can be used.

Additionally, the IE "Multiple E-UTRA frequency info extension list" 612 will be considered first in some embodiments to provide values for "E-UTRA frequency and priority" and "E-UTRA frequency and priority extension." Only when a list element in "Multiple E-UTRA frequency info extension list" 612 is set to absent (e.g., list elements 614, 616, 618, and 620) shall a corresponding entry (e.g., list elements 622 and 624) from "Multiple E-UTRA frequency info list" 626 be merged and used for generating an entry in the concatenated "E-UTRA frequency and priority" and "E-UTRA frequency and priority extension" lists. As will be appreciated upon examination of FIG. 6, embodiments described herein will eliminate the need to use reserved values of 65535 for EARFCN and 64 for E-UTRA frequency bands in the legacy IEs to refer to the corresponding extension EARFCN and E-UTRA frequency band IEs. While "Multiple E-UTRA frequency info extension list" is shown as having no legacy information, it will be understood that in some embodiments the "Multiple E-UTRA frequency info extension list" can include legacy information. Similarly, the "Multiple E-UTRA frequency info list" can include extension information in addition to, or instead of, legacy information.

Figure 7:
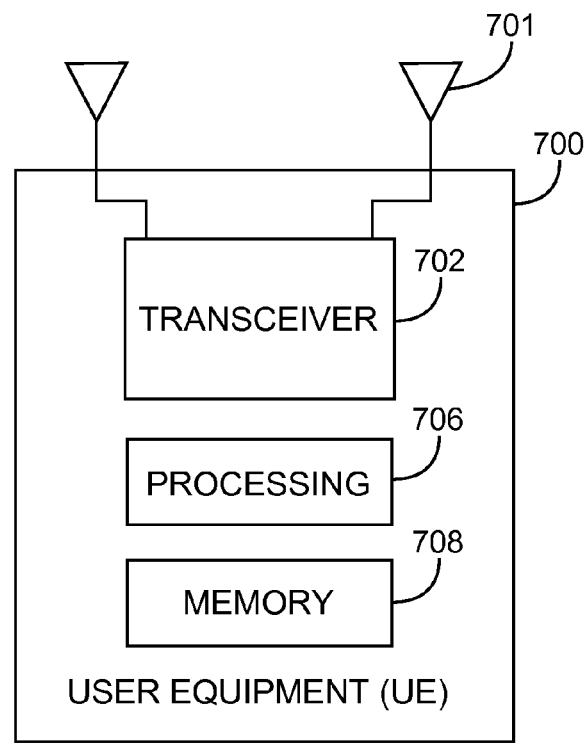
FIG. 7 is a functional diagram of a User Equipment (UE) in accordance with some embodiments.
Figure 8:
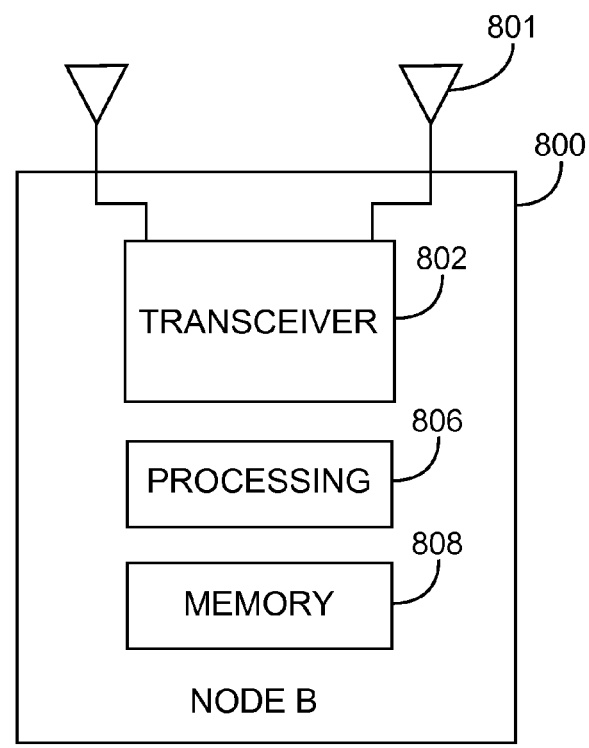
FIG. 8 is a functional diagram of a Node-B in accordance with some embodiments.

FIG. 7 shows a block diagram of a UE 700 in accordance with some embodiments, while FIG. 8 shows a block diagram of a Node-B 800 in accordance with some embodiments. It should be noted that in some embodiments, the Node-B 800 may be a stationary non-mobile device. The UE 700 may be a UE 111 or 112 as depicted in FIG. 1, while the Node-B 800 may be a Node-B 102 as depicted in FIG. 1.

The UE 700 will include transceiver circuitry 702 for transmitting and receiving signals to and from the Node-B 800, other Node-Bs or eNodeBs, other UEs or other devices using one or more antennas 701, while the Node-B 800 will include transceiver circuitry 802 for transmitting and receiving signals to and from the UE 700, other Node-Bs or eNodeBs, other UEs or other devices using one or more antennas 801. The UE 700 also includes processing circuitry 706 and memory 708 arranged to perform the operations described herein, and the Node-B 800 also includes processing circuitry 806 and memory 808 arranged to perform the operations described herein. The processing circuitry 706 and 806 can include PHY, MAC, RRC and/or any other protocol sublayers.

In one embodiment, the UE 700 receives MFBI signaling, as described earlier herein with respect to FIG. 5, that includes an MFBI list. The MFBI list includes elements that correspond to E-UTRA frequency bands on which the neighboring LTE cells are operated. The MFBI list can include either or both of a "Multiple E-UTRA frequency info extension list" defined in accordance with a standard of the 3GPP family of standards, or a "Multiple E-UTRA frequency info list" defined in accordance with a standard of the 3GPP family of standards. Both lists can be used to signal overlapping E-UTRA frequency bands corresponding to an entry in the "E-UTRA frequency and priority list" IE or the "E-UTRA frequency and priority extension list" IE as described earlier herein with respect to FIG. 5. As described earlier herein, each entry in the "E-UTRA frequency and priority list" and in the "E-UTRA frequency and priority extension list" defines an EARFCN value and a priority value for the respective EARFCN.

Both or either of the "Multiple E-UTRA frequency info extension list" and the "Multiple E-UTRA frequency info list" can be used to signal E-UTRA frequency bands in both the legacy range of 1-64 as well as in any extended range defined in current or future versions of a standard of the 3GPP family of standards or other family of standards. The UE 700 will then merge the "Multiple E-UTRA frequency info extension list" and the "Multiple E-UTRA frequency info list" as described earlier with reference to FIG. 6 to determine which EARFCN values and priority values should be used for corresponding E-UTRA frequency bands. For example, the UE 700 can select an EARFCN value to be used for the corresponding E-UTRA frequency band from a "Multiple E-UTRA frequency info extension list" element if the "Multiple E-UTRA frequency info extension list" element is not set to a placeholder value indicating that the "Multiple E-UTRA frequency info extension list" element is absent. Otherwise, the UE 700 can select an EARFCN value to be used for the corresponding E-UTRA frequency band from a "Multiple E-UTRA frequency info list" element. However, embodiments can merge the "Multiple E-UTRA frequency info extension list" and the "Multiple E-UTRA frequency info list" according to any other criteria or algorithm. For example, the UE 700 can merge the lists by assigning default higher priority to entries in the "Multiple E-UTRA frequency info list," or the UE 700 or network 100 can assign flexible priorities to each E-UTRA frequency band, among other criteria or algorithms.

The number of list elements for E-UTRA frequency and priority information is equal to a sum of the number of entries in an "E-UTRA frequency and priority list" plus the number of entries in an "E-UTRA frequency and priority extension list." For example, as described earlier herein, the number of list elements for E-UTRA frequency and priority information can be less than or equal to a value in the IE "maxNumEUTRAFreqs." The number of entries in an "E-UTRA frequency and priority list" is given by the value specified in IE "Number of applicable EARFCN" and the number of entries in the "E-UTRA frequency and priority extension list" can be given by the value in the IE "maxNumEUTRAFreqs," minus the value specified in IE "Number of applicable EARFCN."

The Node-B 800 can transmit MFBI signaling that is included in the above-described "E-UTRA frequency and priority info list". The antennas 701, 801 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 701, 801 may be effectively separated to take advantage of spatial diversity and the different channel characteristics that may result.

Although the UE 700 and Node-B 800 are each illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 9:
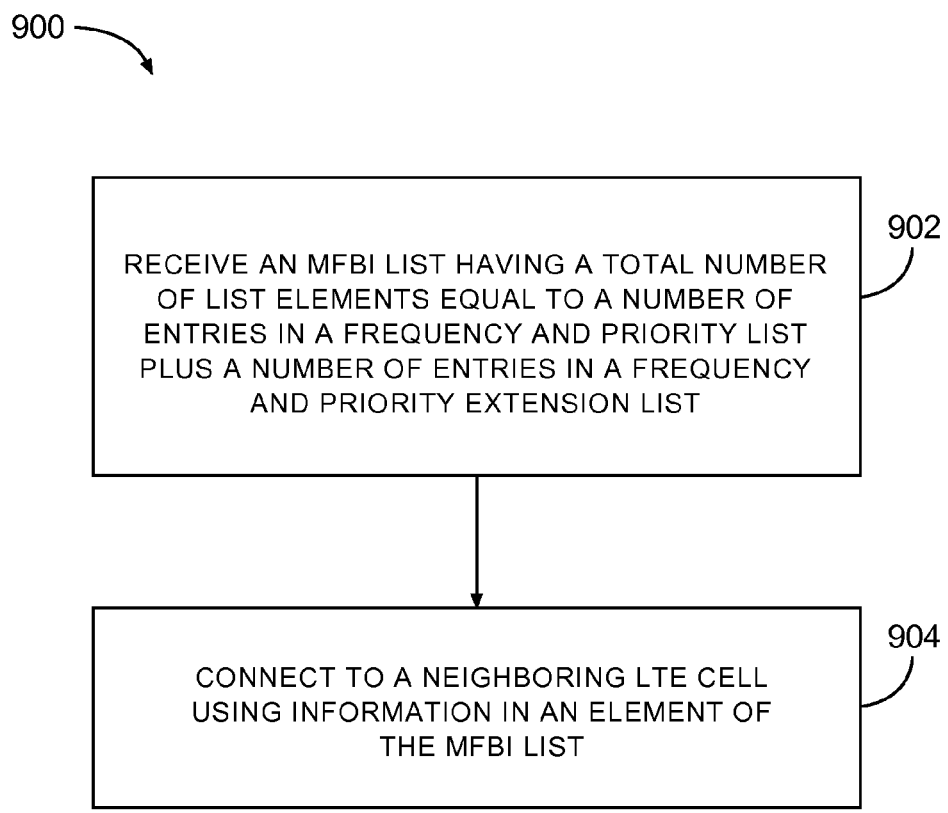
FIG. 9 illustrates the operation of a method for signaling optimization for extended EARFCN and E-UTRA frequency bands in UMTS in accordance with some embodiments.

Referring to FIG. 9 a method 900 of supporting multi-band signaling in a network is shown. It is important to note that embodiments of the method 900 may include additional or even fewer operations or processes in comparison to what is illustrated in FIG. 9. In addition, embodiments of the method 900 are not necessarily limited to the chronological order that is shown in FIG. 9. In describing the method 900, reference may be made to FIGS. 1-8, although it is understood that the method 900 may be practiced with any other suitable systems, interfaces and components.

In addition, while the method 900 and other methods described herein may refer to Node-Bs 102 or UEs 111 and 112 operating in accordance with 3GPP or other standards, embodiments of those methods are not limited to just those Node-Bs 102 and UEs 111, 112 and may also be practiced on other mobile devices, such as a Wi-Fi access point (AP) or user station (STA). Moreover, the method 900 and other methods described herein may be practiced by wireless devices configured to operate in other suitable types of wireless communication systems, including systems configured to operate according to various IEEE standards such as IEEE 802.11.

At operation 902, the UE 111 or 112 will receive signaling that includes an "E-UTRA frequency and priority info list" at least somewhat similar to that described earlier herein with respect to FIG. 1-8. For example, the "E-UTRA frequency and priority info list" can include list elements corresponding to overlapping E-UTRA frequency bands on which neighboring LTE cells are operated. As described earlier herein, a total count of list elements for E-UTRA frequency and priority information is representative of a sum of a number of entries in an "E-UTRA frequency and priority list" IE and a number of entries in an "E-UTRA frequency and priority extension list" IE.

In operation 904, the UE 111 or 112 will connect to a neighboring LTE cell using information in an element of the MFBI list.

The UE 111 or 112 will determine the overlapping E-UTRA frequency bands corresponding to an entry in the "E-UTRA frequency and priority list" or the "E-UTRA frequency and priority extension list" based on a "Multiple E-UTRA frequency info extension list" and a "Multiple E-UTRA frequency info list" according to merging algorithms described earlier herein.

It should be noted that the discussion of the method 900 and other discussions herein may refer to SIBs, which may be broadcast messages transmitted by the Node-B 102 that are receivable by UEs operating in a cell. In some embodiments, the SIB may be a SystemInformationBlockType19 message of the 3GPP or other standards, which may also be referred to as "SIB-19" or as a "SIB-19" message. The operations and techniques described herein are not limited to SIB-19 messages, however, and may be applied to other types or embodiments of System Information Blocks of 3GPP or other standards. The operations and techniques described herein are also not limited to SIBs, and similar operations and techniques may also be applied to other messages transmitted by the Node-B 102, including paging messages for individual UEs or groups of UEs or other control messages.

A non-transitory computer-readable storage medium that stores instructions for execution by one or more processors to perform operations supporting multi-band signaling in a network is disclosed herein. The operations may configure the one or more processors to receive, in MFBI signaling, an MFBI list that includes list elements corresponding to E-UTRA frequency bands on which the neighboring LTE cells are operated, wherein a count of list elements for E-UTRA frequency and priority information is representative of a sum of a number of entries in an "E-UTRA frequency and priority list" and a number of entries in an "E-UTRA frequency and priority extension list," wherein each list element of the MFBI list corresponds to an entry in the E-UTRA frequency and priority list or the E-UTRA frequency and priority extension list, and wherein each entry in the E-UTRA frequency and priority list and the E-UTRA frequency and priority extension list defines an EARFCN value and a priority value for the respective EARFCN.

In some embodiments, mobile devices or other devices described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the mobile device or other device can be a User Equipment (UE) or an Evolved Node-B (eNB) configured to operate in accordance with 3GPP standards. In some embodiments, the mobile device or other device may be configured to operate according to other protocols or standards, including IEEE 802.11 or other IEEE standards. In some embodiments, the mobile device or other device may include one or more of a keyboard, a display, a non-volatile memory port, multiple antennas, a graphics processor, an application processor, speakers, and other mobile device elements. The display may be an LCD screen including a touch screen.

The Abstract is provided to allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. A User Equipment (UE) supporting multi-band signaling in a network, the UE comprising transceiver and processing circuitry to:
receive, in multiple frequency band indicators (MFBI) signaling, an MFBI list that includes elements that correspond to evolved Universal Terrestrial Radio Access (E-UTRA) frequency bands on which neighboring LTE cells are operated, wherein each element of the MFBI list corresponds to an entry in one of a E-UTRA frequency and priority list and an E-UTRA frequency and priority extension list,
select a value to be used for the corresponding E-UTRA frequency band based on a Multiple E-UTRA frequency info extension list element if the Multiple E-UTRA frequency info extension list element is not set to a first value that indicates that the Multiple E-UTRA frequency extension list element is absent and select a value based on a Multiple E-UTRA frequency into list element otherwise, wherein a total count of elements for E-UTRA frequency and priority equals a sum of a number of entries in the E-UTRA frequency and priority list and a number of entries in the E-UTRA frequency and priority extension list, wherein each entry in the E-UTRA frequency and priority list and the E-UTRA frequency and priority extension list defines an evolved absolute radio frequency channel number (EARFCN) value and a priority value for the respective EARFCN, and
connect to a neighboring LTE cell using information in an element of the MFBI list.

2. The UE of claim 1, wherein the MFBI list includes elements corresponding to a Multiple E-UTRA frequency info extension list defined in accordance with a standard of the 3rd Generation Partnership Project (3GPP) family of standards.

3. The UE of claim 2, wherein a value corresponding to at least one E-UTRA band is in a range of 65-256.

4. The UE of claim 1, wherein the MFBI list further includes elements corresponding to a Multiple E-UTRA frequency info list defined in accordance with a standard of the 3rd Generation Partnership Project (3GPP) family of standards.

5. The UE of claim 4, wherein a value corresponding to at least one E-UTRA frequency band is in a range of 1-64.

6. The UE of claim 4, wherein the MFBI list further includes one or more elements corresponding to a Multiple E-UTRA frequency info extension list.

7. The UE of claim 1, wherein the MFBI list is received in a Type 19 System Information Block (SIB).

8. A non-transitory computer-readable storage medium that stores instructions for execution by one or more processors to perform operations for supporting multi-band signaling in a network, the operations to configure the one or more processors to:
receive, in multiple frequency band indicators (MFBI) signaling, an MFBI list that includes elements that correspond to evolved Universal Terrestrial Radio Access (E-UTRA) frequency bands on which neighboring LTE cells are operated, wherein each element of the MFBI list corresponds to an entry in one of the E-UTRA frequency and priority list and the E-UTRA frequency and priority extension list, and
select a value to be used for the corresponding E-UTRA frequency band based on a Multiple E-UTRA frequency info extension list element if the Multiple E-UTRA frequency info extension list element is not set to a first value that indicates that the Multiple E-UTRA frequency info extension list element is absent and select a value based on a Multiple E-UTRA frequency info list element otherwise, wherein a total count of elements for E-UTRA frequency and priority equals a sum of a number of entries in the E-UTRA frequency and priority list and a number of entries in the E-UTRA frequency and priority extension list, wherein each entry in the E-UTRA frequency and priority list and the E-UTRA frequency and priority extension list defines an evolved absolute radio frequency channel number (EARFCN) value and a priority value for the respective EARFCN.

9. The non-transitory machine-readable medium of claim 8, wherein the MFBI list includes a Multiple E-UTRA frequency info extension list defined in accordance with a standard of the 3rd Generation Partnership Project (3GPP) family of standards, and wherein a value corresponding to at least one E-UTRA frequency band is in a range of 65-256.

10. The non-transitory machine-readable medium of claim 9, wherein the MFBI list includes a Multiple E-UTRA frequency info list defined in accordance with a standard of the 3GPP family of standards, and wherein a value corresponding to at least one E-UTRA frequency band is in a range of 1-64.

11. The non-transitory machine-readable medium of claim 9, wherein the MFBI list includes, in addition to the Multiple E-UTRA frequency info extension list, a Multiple E-UTRA frequency info list defined in accordance with a standard of the 3GPP) family of standards, and wherein a value within the Multiple E-UTRA frequency info list is in the range of 1-64.

12. A method of supporting multi-band signaling in a network, the method comprising:
receiving multiple frequency band indicators (MFBI) signaling that includes an MFBI list, an MFBI list that includes list elements corresponding to evolved Universal Terrestrial Radio Access (E-UTRA) frequency bands on which neighboring LTE cells are operated,
select a value to be used for the corresponding E-UTRA frequency band based on a Multiple E-UTRA frequency info extension list element if the Multiple E-UTRA frequency info extension list element is not set to a first value that indicates that the Multiple E-UTRA frequency info extension list element is absent and select a value based on a Multiple E-UTRA frequency info list element otherwise, wherein a total count of elements for E-UTRA frequency and priority equals a sum of a number of entries in the E-UTRA frequency and priority list and a number of entries in the E-UTRA frequency and priority extension list, wherein each entry in the E-UTRA frequency and priority list and the E-UTRA frequency and priority extension list defines an evolved absolute radio frequency channel number (EARFCN) value and a priority value for the respective EARFCN, and
connecting to a neighboring LTE cell based on information in a list element of the MFBI list.

* * * * *

UNITED STATES PATENT AND TRADEMARK OFFICE
CERTIFICATE OF CORRECTION

PATENT NO. : 9,867,206 B2  
APPLICATION NO. : 15/026788  
DATED : January 9, 2018  
INVENTOR(S) : Zitzmann et al.

Page 1 of 1

It is certified that error appears in the above-identified patent and that said Letters Patent is hereby corrected as shown below:

On the Title Page

Page 5, Column 2, Item (56), under "Other Publications", Line 23, delete "informa"," and insert --information",-- therefor In the Claims Column 9, Line 23, in Claim 1, after "frequency", insert --info--

Column 9, Line 25, in Claim 1, delete "into" and insert --info-- therefor

Column 10, Line 36, in Claim 11, delete "3GPP)" and insert --(3GPP)-- therefor

Column 10, Line 42, in Claim 12, after "receiving", insert --,--

Signed and Sealed this  
Twenty-first Day of April, 2020

Andrei Iancu  
*Director of the United States Patent and Trademark Office*